(12) United States Patent
Sterrantino et al.

(10) Patent No.: US 7,269,670 B2
(45) Date of Patent: Sep. 11, 2007

(54) ANALOG ETHERNET DETECTOR HAVING FIRST LOGIC CIRCUIT AND SECOND LOGIC CIRCUIT COUPLED TO OUTPUT SIGNAL DETECTORS TO DETERMINE ETHERNET AND NON-ETHERNET SIGNALS

(75) Inventors: Scott Sterrantino, Frisco, TX (US); Win N. Maung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 641 days.

(21) Appl. No.: 10/455,188

(22) Filed: Jun. 5, 2003

(65) Prior Publication Data

US 2004/0250174 A1    Dec. 9, 2004

(51) Int. Cl.
*G06F 3/00* (2006.01)
*H04J 3/16* (2006.01)
*H04L 12/50* (2006.01)

(52) U.S. Cl. ............................. 710/16; 710/14; 710/15; 370/255; 370/388; 370/400; 370/419; 370/465; 455/575.1; 455/566; 714/43

(58) Field of Classification Search .................. 714/43; 455/575.1, 566; 370/255, 400, 419, 465, 370/388; 710/14–16
See application file for complete search history.

(56) References Cited

U.S. PATENT DOCUMENTS

| | | | |
|---|---|---|---|
| 6,876,654 B1* | 4/2005 | Hegde | 370/392 |
| 7,180,908 B2* | 2/2007 | Valavi et al. | 370/465 |
| 2004/0066790 A1* | 4/2004 | Valavi et al. | 370/419 |

\* cited by examiner

*Primary Examiner*—Tammara Peyton
(74) *Attorney, Agent, or Firm*—William B Kempler; W. James Brady, III; Frederick J. Telecky, Jr.

(57) ABSTRACT

An analog Ethernet detector determines if an IEEE 1394b long haul application using Category 5 (CAT 5 UTP) cable, is connected to an Ethernet which share certain pins of the RJ45 connector used to connect devices to the CAT 5 cable. The detector does not require a processor core or clocking and can be built as a completely analog device.

9 Claims, 1 Drawing Sheet

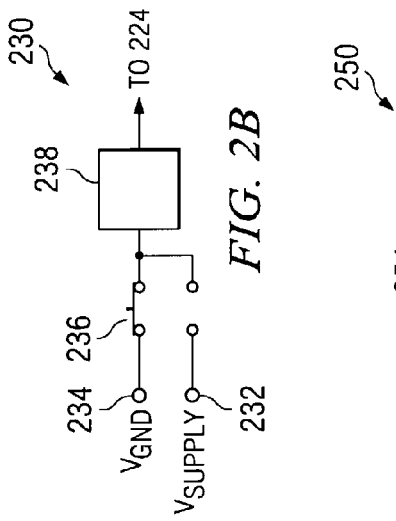
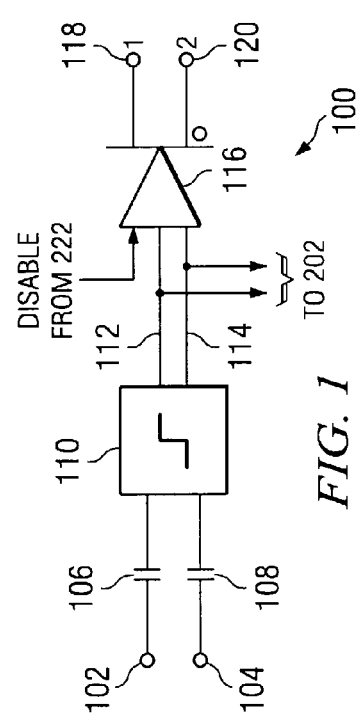
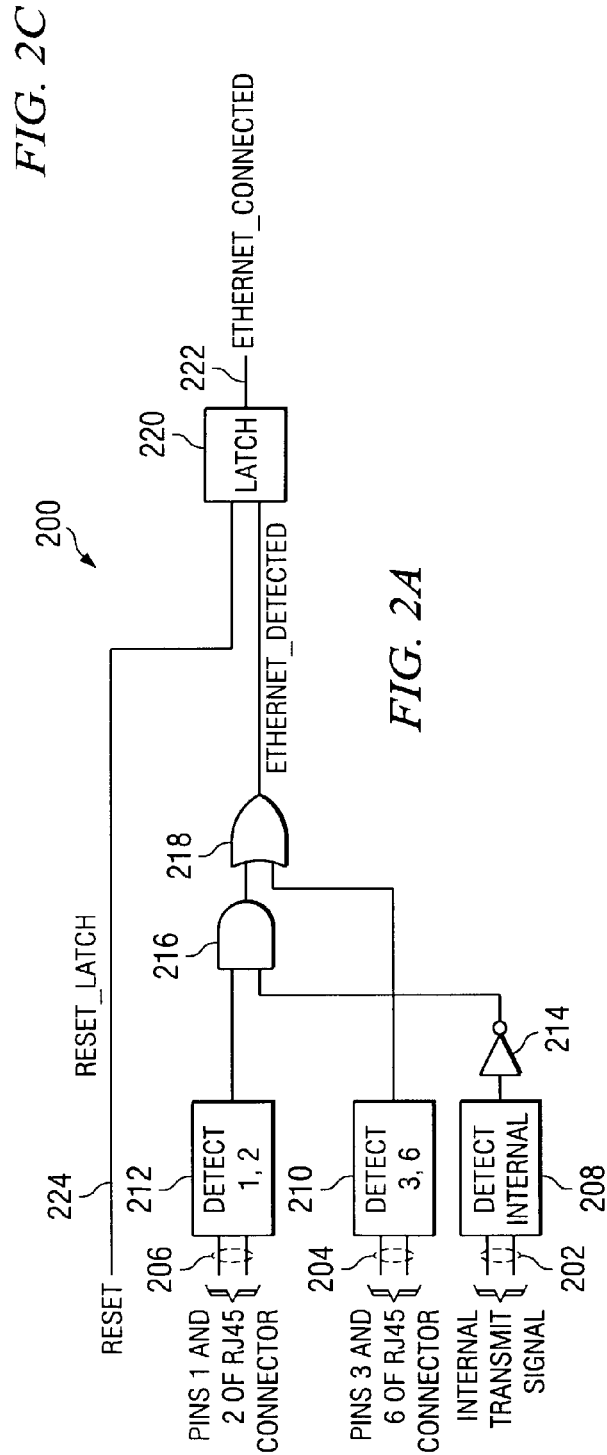

ANALOG ETHERNET DETECTOR HAVING FIRST LOGIC CIRCUIT AND SECOND LOGIC CIRCUIT COUPLED TO OUTPUT SIGNAL DETECTORS TO DETERMINE ETHERNET AND NON-ETHERNET SIGNALS

BACKGROUND OF THE INVENTION

The present invention relates to an Ethernet detector and more specifically to an analog Ethernet detector for IEEE 1394b Long-Haul Applications.

The Institute of Electrical and Electronics Engineers has approved a 1394b Standard which is poised to become the home networking Standard of choice for connecting consumer electronics devices such as audio/visual devices with personal-computers. The IEEE 1394b Standard can provide high-speed 100 Mb/second transmission speeds at distances up to 100 m over Standard Category 5 (CAT 5) cable. This cable is sometimes referred to as CAT5 UTP, for untwisted pair cable. The IEEE 1394b Standard is a low power yet high-speed, plug and play system which supports both isochronous data such as video and voice and asynchronous data such as IP. The ability to utilize CAT 5 cable is a big advantage because many homes today are already wired with this type of cable. This will allow consumers the ability to provide advanced home network and create a high-speed connectivity between their living room audio/video components and their home office.

The ability to transmit on CAT 5 cable, which makes this system so attractive, is also the potential cause of a problem for the consumer. The reason that consumers have CAT 5 cable wired throughout their home is for an Ethernet connection and not for connecting consumer audio/visual components to their home office. The connectors for IEEE 1394b and to the Ethernet on CAT 5 cable are identical and the consumer may not know which wiring is connected to the Ethernet and which wiring is for the IEEE 1394b connection. Worse, the current embodiment of IEEE 1394b shares some pins as an Ethernet. If the consumer were to connect a IEEE 1394b device to the Ethernet, the data that is sent from the device over the Ethernet may interfere with the network or computers connected thereto. Accordingly there is a need for a circuit to detect connection to the Ethernet.

There is a need for an analog circuit that is compatible with any S100 1394b compliant device to detect connection to an Ethernet without the need for a processor core or a timing circuit.

SUMMARY OF THE INVENTION

It is a general object of the invention to provide an analog Ethernet detector. This and other objects and features of the present invention are provided, in accordance with one aspect of the invention by an analog Ethernet detector comprising a first signal detector coupled to transmit conductors of an Ethernet. A second signal detector is coupled to receive conductors of an Ethernet. A third signal detector is coupled to a non-Ethernet transmit signal. A first logic circuit is coupled to an output to the first and third signal detectors for determining that a signal on the transmit conductors is not a non-Ethernet signal. A second logic circuit is coupled to an output from the first logic circuit and the second signal detector for generating an Ethernet_detected signal.

Another aspect of the invention includes a method of detecting that an IEEE 1394b signal is connected to an Ethernet comprising detecting a signal having a predetermined voltage level on Ethernet transmit conductors and generating a first signal. Detecting an IEEE 1394b signal generated for transmission on the transmit conductors and generating a second signal. Detecting an Ethernet transmission having a predetermined voltage level on Ethernet receive conductors and generating a third signal. Generating a first logic signal from the first and second signals. Generating a second logic signal indicating that Ethernet has been detected from the first logic signal and the third signal.

BRIEF DESCRIPTION OF THE DRAWINGS

FIG. 1 is a circuit diagram in block form of a portion of the transmit circuit for a IEEE 1394b to CAT 5 interface; and FIG. 2A is a circuit diagram for an embodiment of the present invention according to the current IEEE 1394b Standard, FIG. 2B is a first reset circuit for the latch of the circuit of FIG. 2A, and FIG. 2C is a second reset circuit for the latch of the circuit of FIG. 2A.

DETAILED DESCRIPTION

The IEEE 1394b Standard utilizes pins 1 and 2 on a CAT5 UTP for transmission to the network and pins 7 and 8 for reception from the network. Ethernet connections utilize pins 1 and 2 to transmit to the network and pins 3 and 6 to receive data from the network. Pins 1 and 2 are therefore used by both an IEEE 1394b network and an Ethernet for transmission to the network. This is done to provide backwards compatibility to the older IEEE 1394a systems in which only four pairs are provided. Thus, both the Ethernet and IEEE 1394b systems utilize pins 1 and 2 for transmission. This problem is further complicated by the fact that Ethernet connections can use two types of cables. Crossover cables are used to connect the transmit pins 1 and 2 to the reception pins 3 and 6 in some applications. However, some Ethernet devices such as hubs have the crossover built into the device, and thus crossover cable cannot be used. In these situations, patch cables are used. In patch cables pins 1 and 2 on the transmit side are wired to pins 1 and 2 of the reception side and pins 3 and 6 on the transmit side are wired pins 3 and 6 of the reception side of the cable. Therefore, it is necessary to look for Ethernet transmissions on pins 1 and 2 as well as 3 and 6.

FIG. 1 shows a simplified block diagram of a transmit circuit for an IEEE 1394b interface generally as 100. Pins 102 and 104 are located on an IEEE 1394b interface connector and the signals provided at these terminals are coupled via the capacitors 106 and 108 to comparator 110. The capacitors provide AC coupling to remove any DC component of the signals applied to pins 102 and 104. If the signal levels on pins 102 and 106 are sufficiently high, the comparator 110 provides an output on lines 112 and 114 to differential output amplifier 116 which amplifies the signals and provides a differential output to pins 118 and 120, respectively. These correspond to pins 1 and 2 on the CAT 5 cable. The output of the comparator 110 on lines 112 and 114 are also coupled to the inputs 202 of FIG. 2.

Referring to FIG. 2, the present invention in accordance with the current IEEE 1394b Standard, is shown generally as 200. The circuit comprises three voltage detectors 208, 210, 212, all of known design. Each of these detectors 208, 210 and 212 responds to a predetermined voltage level to detect a signal present on the input lines. Pins 3 and 6 of the RJ45 connector are the receive pins 204 which are connected to voltage detector 210. If there is a voltage of sufficient magnitude to be detected by detector 210, this means that a signal received on pins 3 and 6 of the RJ45 connector must be an Ethernet signal. The output of detector 210 is fed into one input of a two input OR gate 218. The output of OR gate 218 is the Ethernet_detected signal which is applied to the set input of latch to 220. The output of latch 220 is the Ethernet_connected signal on line 222. This can be connected to other devices (not shown) such as a LED, for example, to indicate to a consumer that the device has been plugged into an Ethernet_connected socket and not an IEEE 1394b connected socket.

Pins 1 and 2 of the RJ45 connector are coupled to lines 206 and which are input to the voltage detector 212. If the voltage across pins 1 and 2 is of sufficient magnitude, the detector will provide a digital one output which will indicate one of two possibilities. One possibility is that there is a signal on the Ethernet, in which case the circuit is to be disabled. Another possibility is that there is a signal at terminals 102,104 which is being transmitted across from the IEEE 1394b source. Thus a simple output from detector 212 fails to provide sufficient information. The output of detector 212 is coupled to AND gate 216 which has a second input coupled to the output of detector 208 via inverter 214. The lines 202 from the output 112, 114 of the comparator 110 are coupled to the input of detector 208. If the signal on outputs 112, 114 are of sufficient amplitude to indicate that an IEEE 1394b signal is to be transmitted on the CAT5 cable, then detector 208 will provide a digital one signal at its output, which will be inverted to a digital zero by inverter 214 and input to the 2-input AND gate 216. Thus there will be an output from AND gate 216 only when a signal is detected on lines 206 and not detected on lines 202. A digital one signal output from AND gate 216 and from detector 210 are input to the OR gate 218 which generates a digital one as the Ethernet_detected signal, which is applied to the set input to latch 220. This will set the latch which will provide an Ethernet_connected signal on line 222 to activate a LED, for example. The Ethernet_connected signal is also used to disable the amplifier 116 via a disable input or by disconnecting power to the amplifier.

It is desirable to have latch 220 set because signals on the Ethernet are not continuous and may have a 4 milliseconds spacing between them. Therefore, without presence of latch 220, the circuit would be turning on and off depending upon the transmissions across the Ethernet or the transmissions from the IEEE 1394b device. Resetting of the latch can be accomplished manually in one of two ways. A reset latch signal can be provided on line 224 from manually operated means to reset the latch, as is known in the art. In FIG. 2B such a reset circuit is generally shown as 230. A pushbutton switch 236 switches the reset input 224 to the latch 220 between ground 234 and the voltage supply 234 for the device. Optional debounce circuit 238 will eliminate the effects of bouncing of the switch contacts, as is known in the art. Another way to reset the latch is to operate the push button switch 232 which interrupts the supply of voltage from voltage supply 230 to the input 234 to the latch 220 or the entire circuit shown in FIG. 2. This is illustrated in FIG. 2C generally as 250. The voltage supply 250 to the circuit of FIG. 2A passes through pushbutton switch 254 before being applied as the input voltage 256 for the circuit. Pushing pushbutton switch 254 de-powers the circuit. On power-up, circuitry on the integrated circuit (not shown), which is well known in the art, will cause the latch to be in the unlatched state.

The circuit shown in FIG. 2 provides a simple analog circuit to determine if an IEEE 1394b device is connected to an Ethernet rather than to an IEEE 1394b CAT 5 connection. The circuit does not require a processor core or clocking and can be built as a completely analog device at low-cost in a small size package.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. An analog Ethernet detector comprising:
   a first signal detector coupled to transmit conductors of an Ethernet;
   a second signal detector coupled to receive conductors of an Ethernet;
   a third signal detector coupled to a non-Ethernet transmit signal;
   a first logic circuit coupled to an output to the first and third signal detectors for determining that a signal on the transmit conductors is not a non-Ethernet signal; and
   a second logic circuit coupled to an output from the first logic circuit and the second signal detector for generating an Ethernet detected signal; and a latch coupled to the second logic circuit and responsive to an output thereof to generating an Ethernet connected output signal.

2. The analog Ethernet detector of claim 1 wherein the non-Ethernet transmit signal is a IEEE 1394b signal.

3. The analog Ethernet detector of claim 1 wherein the first and second signal detectors respond to a first predetermined voltage level.

4. The analog Ethernet detector of claim 3 wherein the third signal detector responds to a second predetermined voltage level.

5. The analog signal detector of claim 1 wherein the first logic circuit performs an AND function.

6. The analog signal detector of claim 5 wherein the second logic circuit performs an OR function.

7. The analog Ethernet detector of claim 1 wherein the detector is coupled to Category 5 (CAT 5) via a cable, the transmit conductors being coupled to pins 1 and 2 of an RJ45 connector, the receive conductors being coupled to pins 1 and 2 or 3 and 6 of the RJ45 connector.

8. The analog Ethernet detector of claim 2 wherein the IEEE 1394b signal is transmitted via to pins 1 and 2 and received via pins 3 and 6.

9. The analog Ethernet detector of claim 1 wherein the latch is reset by de-powering the detector.

* * * * *